Aug. 7, 1923.

J. HOWARTH

FILTER CAP FOR CENTRIFUGAL CLARIFIERS

Filed July 30, 1920

1,464,179

Inventor
Jonas Howarth
By his Attorney

Patented Aug. 7, 1923.

1,464,179

UNITED STATES PATENT OFFICE.

JONAS HOWARTH, OF NEWARK, NEW JERSEY.

FILTER CAP FOR CENTRIFUGAL CLARIFIERS.

Application filed July 30, 1920. Serial No. 400,078.

*To all whom it may concern:*

Be it known that I, JONAS HOWARTH, a citizen of the United States, and a resident of Newark, in the county of Essex and State of New Jersey, have invented certain new and useful Improvements in Filter Caps for Centrifugal Clarifiers, of which the following is a specification.

The invention relates to centrifugal apparatus as employed in the clarification of liquids, for example, varnish; and more particularly to the filtering portion or cap thereof employed in the final stages of the clarifying operation and through which the liquid is forced by centrifugal action before delivery from the apparatus.

It has for its object a filter cap which may be constructed of greatly increased diameter, affording thereby greater filtering area and to so secure the filtering medium therein that the same will not clog up the outlets from the cap through which the liquid is finally expelled. The invention, furthermore, has for its object an improved means of fastening the cap to the bowl cover.

In the accompanying drawings which illustrate the invention—

Similar characters of reference designate corresponding parts thruout the several views.

Figure 1:
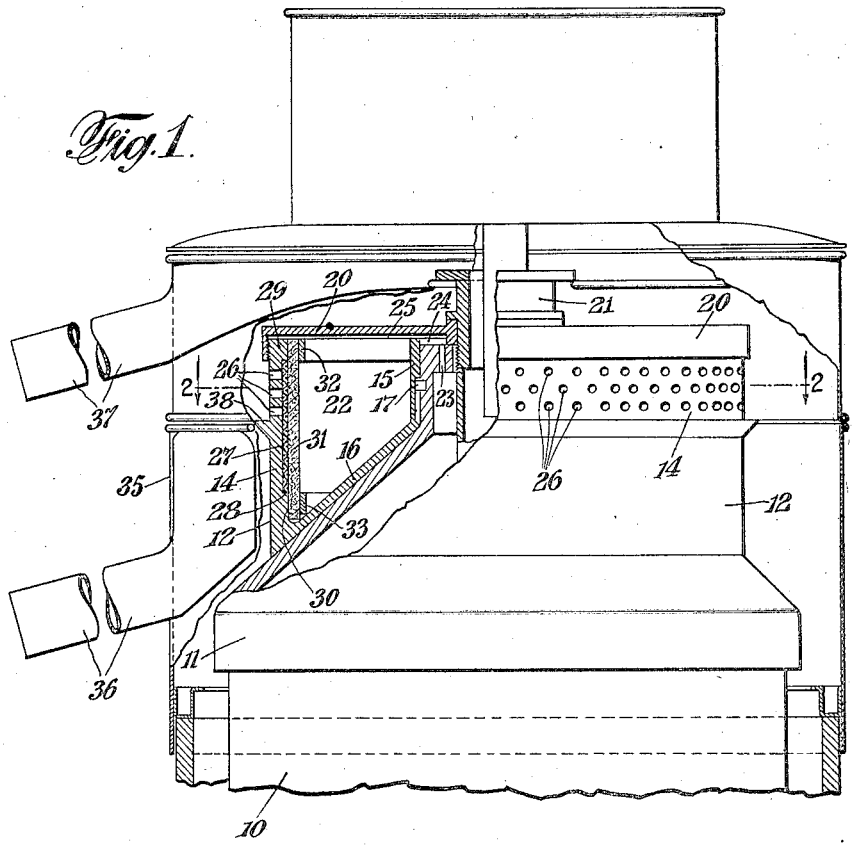
Fig. 1 is an elevation, with parts broken away and partly in section, of the upper portion of a centrifugal clarifier with filter cap attached, the filter cap being shown located as close as possible to the end of the driving spindle and in manner obviating the extension of said cap too high on the machine cover.
Figure 2:
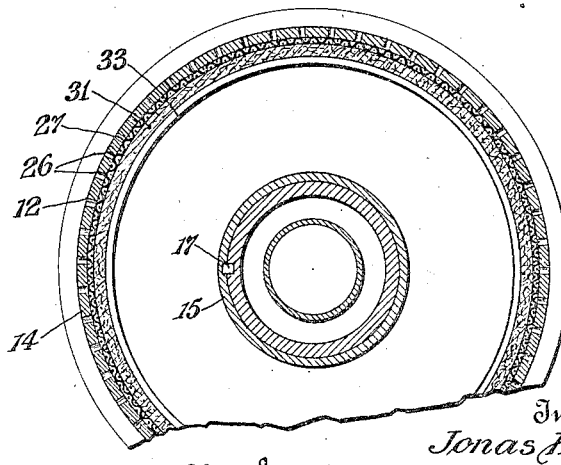
Fig. 2 is a fragmentary section thereof.

Referring to the drawings, 10 designates the rotatable bowl commonly employed in centrifugal separation apparatus and which is closed at its upper portion by a removable top 11 to which is arranged to be secured in manner to be rotatable therewith the filter cap 12 forming the subject of the present invention. This cap consists of an annular vessel having an outer wall 14 and an inner wall 15 with a connecting conical bottom portion 16, the latter fitting snugly over the bowl cover 11. The filter cap is arranged to be removably secured to rotate with the said cover 11. To this end, the wall 15 is exteriorly slotted from the bottom 16 to fit over a pin 17 projecting outwardly from the cover 11, the cap being set thereover until it rests on said cover.

The filter cap is closed at the top by means of a removable cover 20 which is held to the bowl cover 11 thru a tubular lock-nut 21 forming at the same time an inlet to the interior of the bowl. The filter cap thereby provides an annular closed chamber 22 into which the contents from the interior of the bowl 10 are received thru ducts 23 and recesses 24 and 25 respectively thru the cover 11 and in the underface of cover 20.

After being filtered, the liquid is expelled thru suitable spaced outlets or perforations 26 in the outer wall 14. The series of outlets or perforations 26, it will be noted, are arranged only at the upper portion of the chamber and there is placed before same a suitable circular screen 27 such as heavy wire netting or the like which is tightly fitted in a circular recess 28 of the outer wall 14. This recess and screen extend a considerable distance below these perforations; and ahead of same but resting against upper and lower shoulders 29 and 30 respectively, is a circular band 31 of filtering material, such as felt and the like, and which is held firmly to the said shoulders by means of spring clips 32 and 33 respectively. It will thus be noted that the action of these springs is solely against these shoulders and that the felt is not forced mechanically against the screen and wall of the cap, thereby obviating any tendency of being forced into the openings not only of the screen but of the perforations to clog same. Moreover, a large filtering area is obtainable as the liquid will work up thru the lower portion of the recess and eventually out thru the perforations. It is then received in an outlet casing 35 connected independently of the revolving bowl 10 and having an outlet spout 36 as well as an overflow spout 37.

Moreover, a shelf 38 is provided about the circumference of the cap 12 to direct the clarified liquid into the outlet casing and to prevent creepage.

By the construction hereinbefore described, the filter cap portion of the apparatus is located low thereon, being below the liquid inlet and thus reducing the tendency to wabble at the high velocities employed as well as insuring stability of the filter cap without sacrificing filtering area.

I claim:—

1. In centrifugal separator apparatus: a rotatable filter head adapted to receive the partly clarified liquid and comprising a cylindrical vessel having a conical bottom portion seated on the top of the separator apparatus and rotatable therewith, a removable cover for said vessel extending over the interior of said centrifugal apparatus and affording communication between same and the interior of the filter head.

2. In centrifugal separator apparatus: a rotatable filter head adapted to receive the partly clarified liquid and comprising a cylindrical vessel having a conical bottom portion seated on the top of the separator apparatus and rotatable therewith, the upper portion of the outer wall of said vessel being provided with a series of outlets and its inner face recessed, a screen seated therein in advance of the outlets and a filtering medium in advance of said screen, held against the said inner face and independently of said screen.

3. In centrifugal separator apparatus: a rotatable filter head adapted to receive the partly clarified liquid and comprising a cylindrical vessel having a conical bottom portion seated on the top of the separator apparatus and rotatable therewith, a removable cover for said filter head, extending over a portion of the separator apparatus and affording communication between same and the interior of the filter head, and a hollow nut member centrally disposed with reference to said separator member and filter head, in threaded engagement with the former and acting upon the cover of the latter to secure same in position and seal the communication between the former and latter.

4. In centrifugal separator apparatus: a rotatable filter head adapted to receive the partly clarified liquid and comprising a cylindrical vessel having a conical bottom portion seated on the top of the separator apparatus and rotatable therewith, the upper portion of the outer wall of said vessel being provided with a series of outlets and its inner face recessed, a screen seated therein in advance of the outlets and a filtering medium in advance of said screen, held against the said inner face and independently of said screen, a removable cover for said filter head, extending over a portion of the separator apparatus and affording communication between same and the interior of the filter head, and a hollow nut member centrally disposed with reference to said separator member and filter head, in threaded engagement with the former and acting upon the cover of the latter to secure same in position and seal the communication between the former and latter.

Signed at Newark, in the county of Essex and State of New Jersey this 27th day of July A. D. 1920.

JONAS HOWARTH.